United States Patent
Lee

(10) Patent No.: US 10,050,492 B2
(45) Date of Patent: Aug. 14, 2018

(54) POWER COOPERATION SYSTEM FOR EXERCISE APPARATUSES

(71) Applicant: Cheng Kun Lee, Taichung (TW)

(72) Inventor: Cheng Kun Lee, Taichung (TW)

(73) Assignee: Johnson Health Tech. CO. LTD. (TW)

(*) Notice: Subject to any disclaimer, the term of this patent is extended or adjusted under 35 U.S.C. 154(b) by 110 days.

(21) Appl. No.: 15/170,950

(22) Filed: Jun. 2, 2016

(65) Prior Publication Data
US 2017/0288503 A1  Oct. 5, 2017

(30) Foreign Application Priority Data
Mar. 31, 2016 (TW) ............... 105110380 A

(51) Int. Cl.
| H02K 7/18 | (2006.01) |
| H02J 50/10 | (2016.01) |
| H02J 50/15 | (2016.01) |
| H02J 50/80 | (2016.01) |
| A63B 21/005 | (2006.01) |

(52) U.S. Cl.
CPC ............ *H02K 7/1861* (2013.01); *H02J 50/10* (2016.02); *H02J 50/15* (2016.02); *H02J 50/80* (2016.02); *A63B 21/0055* (2015.10)

(58) Field of Classification Search
CPC ........ H02K 7/1861; H02J 50/80; H02J 50/15; H02J 50/10; A63B 21/0055
See application file for complete search history.

(56) References Cited

U.S. PATENT DOCUMENTS

| 8,485,944 B2* | 7/2013 | Drazan ............. A63B 21/0053 482/1 |
| 2016/0126779 A1* | 5/2016 | Park ....................... H02J 50/80 320/108 |

* cited by examiner

*Primary Examiner* — Sundhara Ganesan

(57) ABSTRACT

A power cooperation system among exerciser apparatuses includes at least two exercise apparatuses. The exercise apparatuses have a wireless communication channel therebetween, and each has a motion module, a power generation module, a power storage module and at least one power consuming module. At least one of the exercise apparatuses has a power transmitting module connected to the power generation module and/or the power storage module and being able to transmit an energy wave. The other exercise apparatus has a power receiving module connected to the power storage module for being able to receive the energy wave. Under this arrangement, the power cooperation system is configured to achieve power sharing among exercise apparatuses and ensure that every exercise apparatus has enough power to keep available, and using the excess power by the respective exercise apparatuses efficiently.

10 Claims, 7 Drawing Sheets

POWER COOPERATION SYSTEM FOR EXERCISE APPARATUSES

BACKGROUND

1. Field of the Invention

The present invention relates to exercise apparatuses. More particularly, the present invention relates to a power cooperation system for exercise apparatuses.

2. Description of the Related Art

Indoor exercise is more and more popular in these days. More people are becoming aware of the need to exercise in order to maintain or improve their health and fitness. Since a person's schedule, weather, or other factors may prohibit the person from exercising outdoors, it is more convenient for the person to exercise indoors. Accordingly, indoor exercise apparatuses such as treadmills, stair exerciser apparatuses, steppers, exercise bikes provide such advantages for the person to use.

For electronic indoor exercise apparatuses, the power source may be divided into a plug-in type and a self-powered type. The plug-in exercise apparatus is powered by mains electricity by putting the plug of the exercise apparatus into a socket. The self-powered exercise apparatus is able to convert mechanical energy into electrical energy and the electrical energy could supply power to the exercise apparatus or store the electrical energy into a rechargeable battery of the exercise apparatus for backup. Since the self-powered exercise apparatus has no consumption of mains electricity, it could reduce the cost and enhance environmental benefits. Besides, the self-powered exercise apparatus doesn't need external power supply. It is not limited by locations and number of sockets, so that the arrangement and number of exercise apparatuses are free.

Generally, the power generated by motion of a user at a normal exercising speed could supply power to console parts (e.g. LEDs and displays) and control circuits of the self-powered exercise apparatus. When the exercising speed gets higher, the excess power would be charged into the battery of the exercise apparatus. When the exercising speed gets lower or stopped, the exercise apparatus would use the power stored in the battery to supply the console parts and the control circuits for preventing the exercising program from being interrupted or reset caused by exercising movement of a user being temporarily slow down or stopped.

Specifically, if the exercise apparatus is equipped with a motor, for example, a motor for controlling resistance (e.g. eddy current resistance), or a motor for changing the motion track of the exercise apparatus. It will consume great power of the exercise apparatus rapidly, such that the electric power generated by the exercise apparatus may be insufficient for supplying the motor unless the user exercises much faster to generate more power to satisfy the consumption of the motor. However, the user generally doesn't know the actual power state of the exercise apparatus until the exercise apparatus stops working and interrupts the exercising program.

Moreover, in the gym, some exercise apparatuses may be used less, older models, at bad locations, or generate less mechanical energy, or the motor may consume much more power, in such situations, the electrical quantity is lower to make the exercise apparatus shut down. In contrast, some exercise apparatuses may be used frequently, newer models, at preferred locations or generate much more mechanical energy, in such situations, the electrical quantity of the exercise apparatus is higher. However, as the battery of the exercise apparatus is fully charged, the excess power may be wasted, namely, such excess power is not used efficiently. Therefore, at the same time, some exercise apparatuses may lack power for normal use and some exercise apparatuses may have excess power which needs to be consumed by other electrical loads.

Further benefits and advantages of the present invention will become apparent after a careful reading of the detailed description with appropriate reference to the accompanying drawings.

SUMMARY

The object of the present invention provides a power cooperation system for exercise apparatuses to achieve power sharing among exercise apparatuses and ensure that every exercise apparatus has enough power to work.

According to one aspect of the present invention, a power cooperation system for exercise apparatuses comprises at least one first exercise apparatus and at least one second exercise apparatus. Each exercise apparatus has a motion module, a power generation module, a power storage module and at least one power consuming module. The motion module is driven by an external force to generate mechanical energy. The power generation module is connected to the motion module for converting the mechanical energy of the motion module into electrical energy. The power storage module is connected to the power generation module for storing the electrical energy generated by the power generation module. The power consuming module is electrically connected to the power storage module for consuming the electrical energy stored in the power storage module.

Specifically, the first exercise apparatus and the second exercise apparatus have a wireless communication channel therebetween for transmitting electrical quantity information of the power storage modules of the respective exercise apparatuses. The first exercise apparatus has a power transmitting module and a control unit. The power transmitting module is connected to the power generation module and/or the power storage module of the first exercise apparatus. The power transmitting module could convert the electrical energy of the power generation module and/or the power storage module into an energy wave and transmit to the second exercise apparatus. The control unit is connected to the power storage module and the power transmitting module for controlling the energy wave transmitted from the power transmitting module. The second exercise apparatus has a power receiving module and a control unit. The power receiving module is connected to the power storage module of the second exercise apparatus for receiving the energy wave transmitted from the power transmitting module of the first exercise apparatus and converting the energy wave into electrical energy and stored in the power storage module. The control unit is connected to the power storage module and the power receiving module for controlling the power receiving module to receive the energy wave. More specifically, the control unit of the first exercise apparatus and the control unit of the second exercise apparatus are configured to control transmission and reception of the energy wave according to the electrical quantity information of the power storage module of the respective exercise apparatuses.

Preferably, the second exercise apparatus further comprises a power transmitting module connected to the control unit and the power generation module and/or the power storage module of the second exercise apparatus for converting the electrical energy of the power generation module and/or the power storage module into an energy wave and transmitting to the first exercise apparatus, the control unit configured to control the energy wave transmitted from the power transmitting module; the first exercise apparatus further comprises a power receiving module connected to the control unit and the power storage module of the first exercise apparatus for converting the energy wave into electrical energy and stored in the power storage module, the control unit configured to control the power receiving module to receive the energy wave; the control units of the first exercise apparatus and the second exercise apparatus are configured to control transmission and reception of the energy wave according to the electrical quantity information of the power storage module of the respective exercise apparatuses.

Preferably, the power storage module of each exercise apparatus defines a first preset value and a second preset value; when electrical quantity of the power storage module of the corresponding exercise apparatus is higher than the first preset value, the control unit of the corresponding exercise apparatus controls the power transmitting module to transmit the energy wave; when electrical quantity of the power storage module of the corresponding exercise apparatus is lower than the second preset value, the control unit of the corresponding exercise apparatus controls the power receiving module to receive the energy wave.

Preferably, the first exercise apparatus and the second exercise apparatus are the same type of exercise apparatus, when electrical quantity of the power storage module of the first exercise apparatus is higher than that of the second exercise apparatus, the control unit of the first exercise apparatus controls the power transmitting module to transmit the energy wave to the second exercise apparatus; and the control unit of the second exercise apparatus controls the power receiving module to receive the energy power transmitted by the first exercise apparatus.

Preferably, each exercise apparatus has a communication device connected to the control unit, the wireless communication channel defined between the two communication devices of the two exercise apparatuses.

Preferably, the wireless communication channel is defined between the power transmitting module of the first exercise apparatus and the power receiving module of the second exercise apparatus.

Preferably, the communication device of each exercise apparatus has an information transmission module and an information receiving module, the information transmission module configured to transmit the electrical quantity information of the power storage module, and the information receiving module configured to receive the electrical quantity information of other exercise apparatus.

Preferably, a power distribution device wirelessly may be connected between the exercise apparatuses and defining the wireless communication channel for receiving the electrical quantity information of the power storage modules of the respective exercise apparatuses, the power distribution device configured to transfer a command to the first exercise apparatus to make the control unit of the first exercise apparatus to control the energy wave transmitted from the power transmitting module.

Preferably, the energy wave is electromagnetic waves or ultrasonic waves, and the power transmitting module of each exercise apparatus transmits the energy wave by beams.

Under this arrangement, the power cooperation system of the present invention could make at least one exercise apparatus supply electrical energy to at least one other exercise apparatus in order to prevent any exercise apparatus with low electrical power from being shut down entirely. It will not waste the excess power generated by exercise apparatuses so as to achieve power cooperation purpose and increase utilization of electricity.

Further benefits and advantages of the present invention will become apparent after a careful reading of the detailed description with appropriate reference to the accompanying drawings.

DETAIL DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically depicted in order to simplify the drawings.

Figure 1:
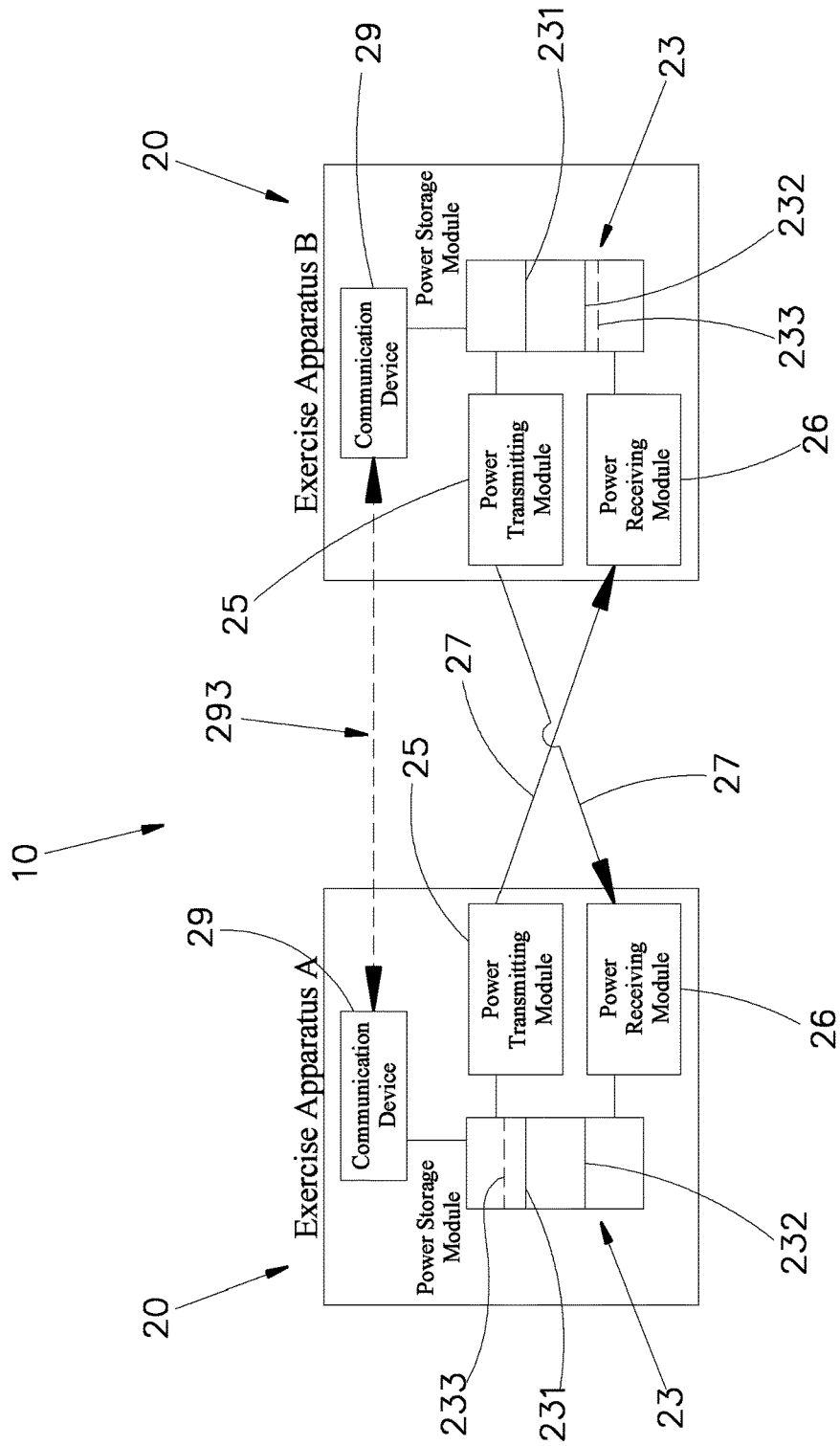
FIG. 1 is a schematic diagram illustrating a power cooperation system for exercise apparatuses in accordance with a first embodiment of the present invention.

Referring to FIG. 1, the present invention provides a power cooperation system which is applied to exercise apparatuses in the same exercise area. The power cooperation system is configured to make one or more exercise apparatuses with more electricity or sufficient electrical energy (e.g. exercise apparatus A) transfer the electrical energy to one or more exercise apparatuses with less electricity or insufficient electrical energy (e.g. exercise apparatus B) for keeping every exercise apparatus at an available state, namely, with enough electricity to work, such that it will not waste the excess power generated by exercise apparatuses so as to achieve power cooperation purpose. The exercise apparatuses are represented by frames in the drawings, and the arrangement of exercise apparatuses is not limited by the present invention.

Figure 2:
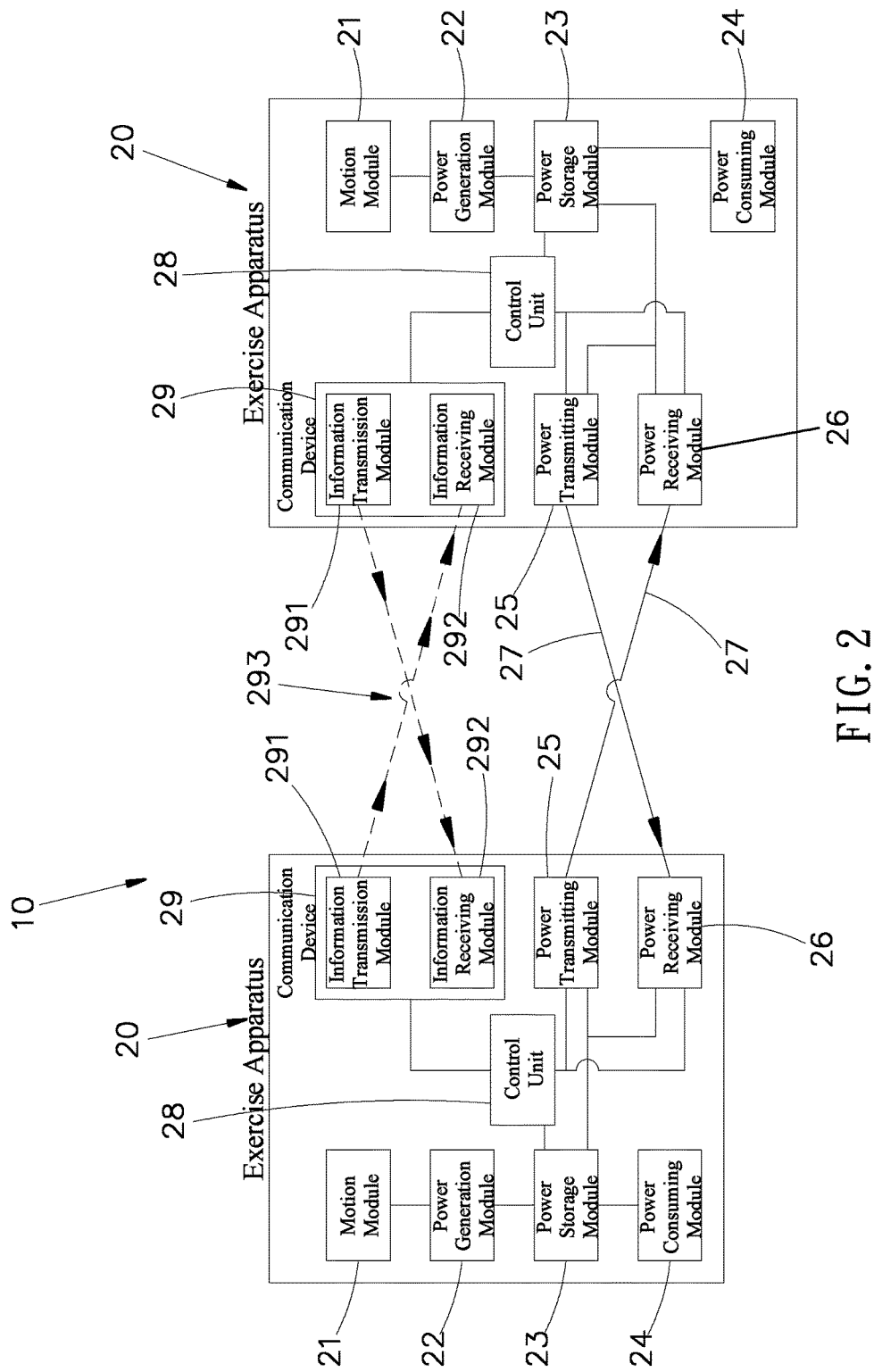
FIG. 2 is a schematic diagram illustrating the architecture of the power cooperation system shown in FIG. 1.

In a preferred embodiment of the present invention as shown in FIG. 2, a power cooperation system 10 is configured to wirelessly transport electric power between two or more exercise apparatuses. First, it is illustrated in at least two exercise apparatuses 20, each exercise apparatus 20 has a motion module 21, a power generation module 22, a power storage module 23, at least one power consuming module 24, a power transmitting module 25, a power receiving module 26, a control unit 28 and a communication device 29. The motion module 21 is provided for a user to perform a specific exercise and such exercise motion of the user will generate mechanical energy. The power generation module 22 is connected to the motion module 21 for converting the mechanical energy of the motion module 22 into electrical energy. The power storage module 23 is connected to the power generation module 22 for storing the electrical energy generated by the power generation module 22. The at least one power consuming module 24 may include console parts of the exercise apparatuses 20, central control circuits or motors that are connected to the power storage module 23 and consume the electrical energy stored in the power storage module 23.

The power transmitting module 25 is connected to the power generation module 22 and/or the power storage module 23 for converting the electrical energy of the power generation module 22 and/or the power storage module 23 into an energy wave 27 and transmitting to other exercise apparatus. In the preferred embodiment of the present invention, the power transmitting module 25 is connected to the power storage module 23. The power receiving module 26 is connected to the power storage module 23 for receiving the energy wave 27 transmitted from the power transmitting module 25 of other exercise apparatus 20 and converting the energy wave 27 into electrical energy and stored in the power storage module 23.

It should be noted that the converting technique of the power transmitting module 25 for converting the electrical energy into the energy wave 27 and the converting technique of the power receiving module 26 for converting the energy wave 27 into the electrical energy are conventional techniques which are not illustrated in the present invention.

In the preferred embodiment of the present invention, the energy wave 27 transmitted from the power transmitting module 25 of each exercise apparatus 20 may be electromagnetic waves or ultrasonic waves or other wireless energy waves, such energy waves are transmitted by beam forming to the power receiving module 26 of a specific exercise apparatus 20. The technique with respect to the beam forming of the energy wave is a conventional technique which is not illustrated in the present invention.

The control unit 28 is respectively connected to the power storage module 23, the power transmitting module 25 and the power receiving module 26. The control unit 28 of each exercise apparatus 20 is configured to control the energy wave 27 transmitted from the power transmitting module 25 or the energy wave 27 received by the power receiving module 26.

The communication device 29 is connected to the control unit 28 and keeps it communicated with another communication device 29 of other exercise apparatus 20. The communication device 29 includes an information transmission module 291 and an information receiving module 292. The information transmission module 291 could transmit electrical quantity information of the power storage modules 23, and the information receiving module 292 could receive the electrical quantity information from the information transmission module 291 of other exercise apparatus 20.

Referring back to FIG. 1, the power storage module 23 of each exercise apparatus 20 defines a first preset value 231 and a second preset value 232. The second preset value 232 could be set to equal or smaller than the first preset value 231. In the preferred embodiment of the present invention, the second preset value 232 is smaller than the first preset value 231. When the electrical quantity 233 of the power storage module 23 is higher than the first preset value 231, the control unit 28 is asked to control the power transmitting module 25 to transmit the energy wave 27 depending on power conditions. When the electrical quantity 233 of the power storage module 23 is between the first preset value 231 and the second preset value 232, the control unit 28 turns the power transmitting module 25 and the power receiving module off so as to make the respective exercise apparatus 20 fail to transmit or receive the energy wave 27. When the electrical quantity 233 of the power storage module 23 is lower than the second preset value 232, the control unit 28 controls the power receiving module 26 to receive the energy wave 27.

The operation mode of the present invention is described below for illustrative purposes, which is not limited by the present invention. In order to distinguish every exercise apparatus 20 conveniently, every exercise apparatus 20 is labeled with various English letters (e.g. A to F) for distinguishable. The structure of each exercise apparatus with English letters is same as said exercise apparatus 20.

FIG. 1 depicts two exercise apparatuses as exercise apparatus A and exercise apparatus B. The two exercise apparatuses A, B could be the same type of exercise apparatuses or different type of exercise apparatuses, for example but not limited to, it could be treadmills, stair exerciser apparatuses, steppers, exercise bikes, weight training apparatuses, or the like. Specifically, the two exercise apparatuses A, B are placed on the same exercise area. Each of the two exercise apparatuses A, B has a communication device 29. The two communication devices 29 of the two exercise apparatuses A, B are communicated with each other wirelessly and defining a wireless communication channel 293. The wireless communication channel 293 is provided for the two exercise apparatuses A, B to keep intercommunicating with each other for obtaining the electrical quantity information of the respective power storage modules 23. When the electrical quantity 233 of the power storage 23 of the exercise apparatus B is lower than the second preset value 232, the control unit 28 of the exercise apparatus B is controlled to turn on the power receiving module 26 of the exercise apparatus B, and thereby the power receiving module 26 is able to receive energy wave from other exercise apparatus. When the electrical quantity 233 of the power storage module 23 of the exercise apparatus A is higher than the first preset value 231, and receiving the electrical quantity information from the exercise apparatus B whose electrical quantity 233 of the power storage module 23 is lower than the second preset value 232, the control unit 28 of the exercise apparatus A is controlled to turn on the power transmitting module 25 and thereby the power transmitting module 25 of the exercise apparatus A transmits the energy wave 27 toward the exercise apparatus B. The power receiving module 26 of the exercise apparatus B receives the energy wave 27 from the exercise apparatus A and converts the energy wave 27 into electrical energy and be stored in the power storage module 23 so as to increase the electrical quantity 233 of the power storage module 23 of the exercise apparatus B for maintaining normal operation of the exercise apparatus B. Under this arrangement, the exercise apparatuses could perform operation for electrical energy transmitting or receiving therebetween whether the exercise apparatuses are standby or occupied so as to achieve power cooperation effect anytime.

It should be noted that the two exercise apparatuses A, B could be communicated to each other without the communication device 29. In practice, the energy wave 27 may be a carrier wave for transmitting the information through space to allow the wireless communication channel 293 to be formed between the power transmitting module 25 and the power receiving module 26 of the two exercise apparatuses A, B. Therefore, the power transmitting module 25 could transmit the energy wave 27 that includes the electrical quantity information of the power storage module 23, and the power receiving module 26 could receive the energy wave 27 that includes the electrical quantity information so as to achieve an exchange of the electrical quantity information of the two exercise apparatuses A, B.

Specifically, when the two exercise apparatuses A, B are designed as the same type of exercise apparatus, for example, the two exercise apparatuses are same as treadmills, stair exerciser apparatuses, steppers, exercise bikes, weight training apparatuses, or the like, the two exercise apparatuses A, B could be set that the power transmission between the two power storage modules 23 of the exercise apparatuses A, B are not limited by the limitation of the first preset value 231 and the second preset value 232, namely, when the electrical quantity 233 of the power storage module 23 of one exercise apparatus (e.g. exercise apparatus A) is higher than that of the other exercise apparatus (e.g. exercise apparatus B), the control unit 28 of the exercise apparatus A controls the power transmitting module 25 to transmit the energy wave 27 toward the exercise apparatus B and the control unit 28 of the exercise apparatus B controls the power receiving module 26 to receive the energy wave 27 from the exercise apparatus A. Therefore, such the same type of exercise apparatuses could transmit electrical energy therebetween anytime so as to achieve power cooperation effect between the exercise apparatuses immediately.

Furthermore, with respect to exercise apparatuses searching and matching, the techniques about how to prevent the energy wave from being received by any other unexpected electronic devices, which are conventional techniques and not illustrated in the present invention.

Figure 3:
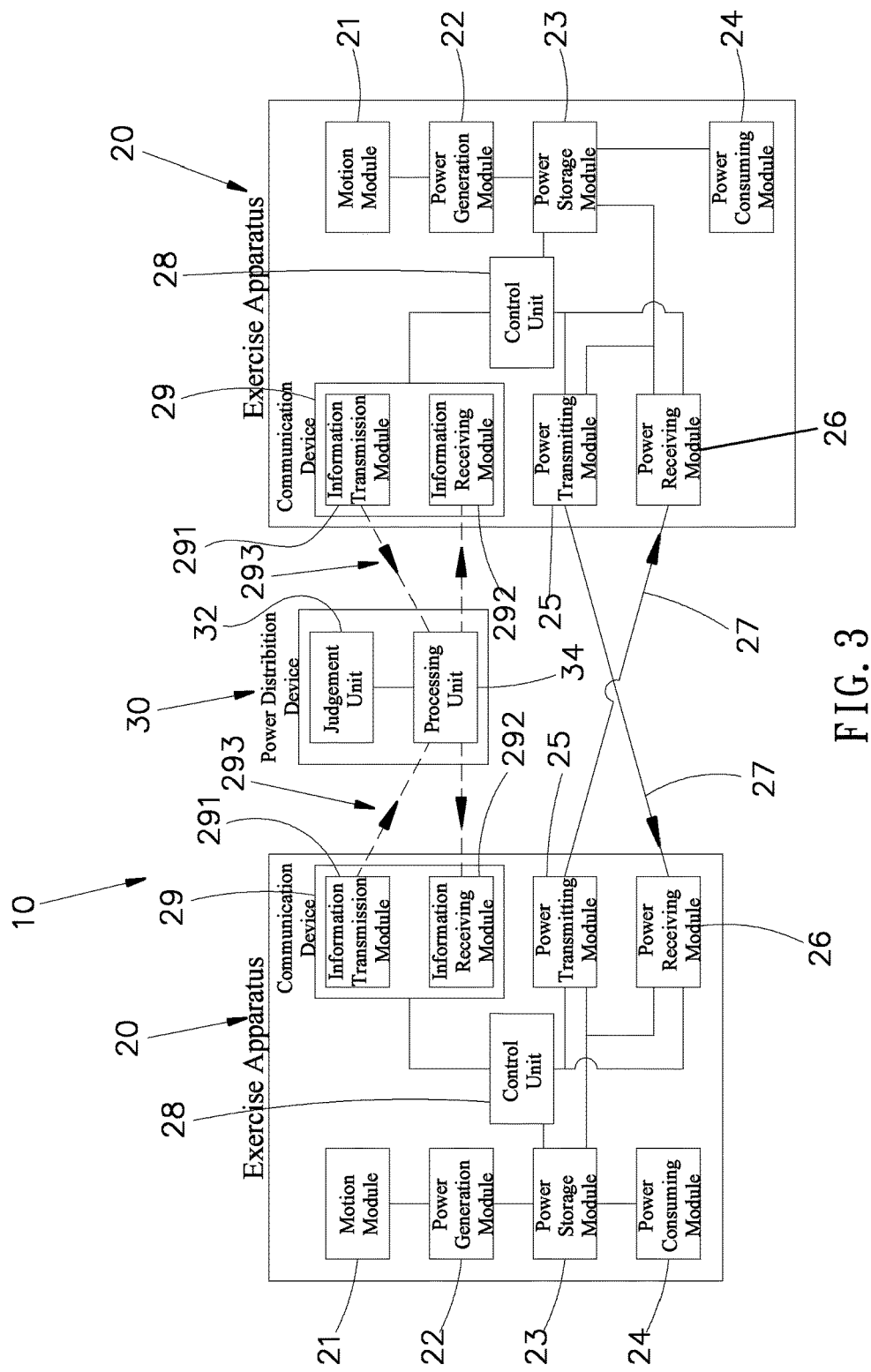
FIG. 3 is a schematic diagram showing a power cooperation system in accordance with a second embodiment of the present invention.

FIG. 3 illustrates another embodiment of the power cooperation system 10 of the present invention, which includes at least two exercise apparatuses 20 as well, each exercise apparatus 20 has same structure as depicted aforementioned, except that the power cooperation system 10 further comprises a power distribution device 30 wirelessly connected among the exercise apparatuses 20 and defining the wireless communication channel 293 therebetween for receiving the electrical quantity information of the power storage modules 23 of the respective exercise apparatuses 20 anytime. The power distribution device 30 is connected to each exercise apparatus 20 via Wi-Fi, Bluetooth or other wireless communication means. The power distribution device 30 includes a judgment unit 32 and a processing unit 34 connected with each other. The processing unit 34 is configured to maintain to communicate with the communication device 29 of the respective exercise apparatus 20 for receiving the electrical quantity information from the information transmission module 291 of each exercise apparatus 20. The judgment unit 32 is configured to make the processing unit 34 to generate a command 36 which includes electrical quantity information of a specific exercise apparatus 20 to the information receiving module 292 of the communication device 29 of at least one exercise apparatus 20 according to the electrical quantity information received by the processing unit 34.

Figure 4:
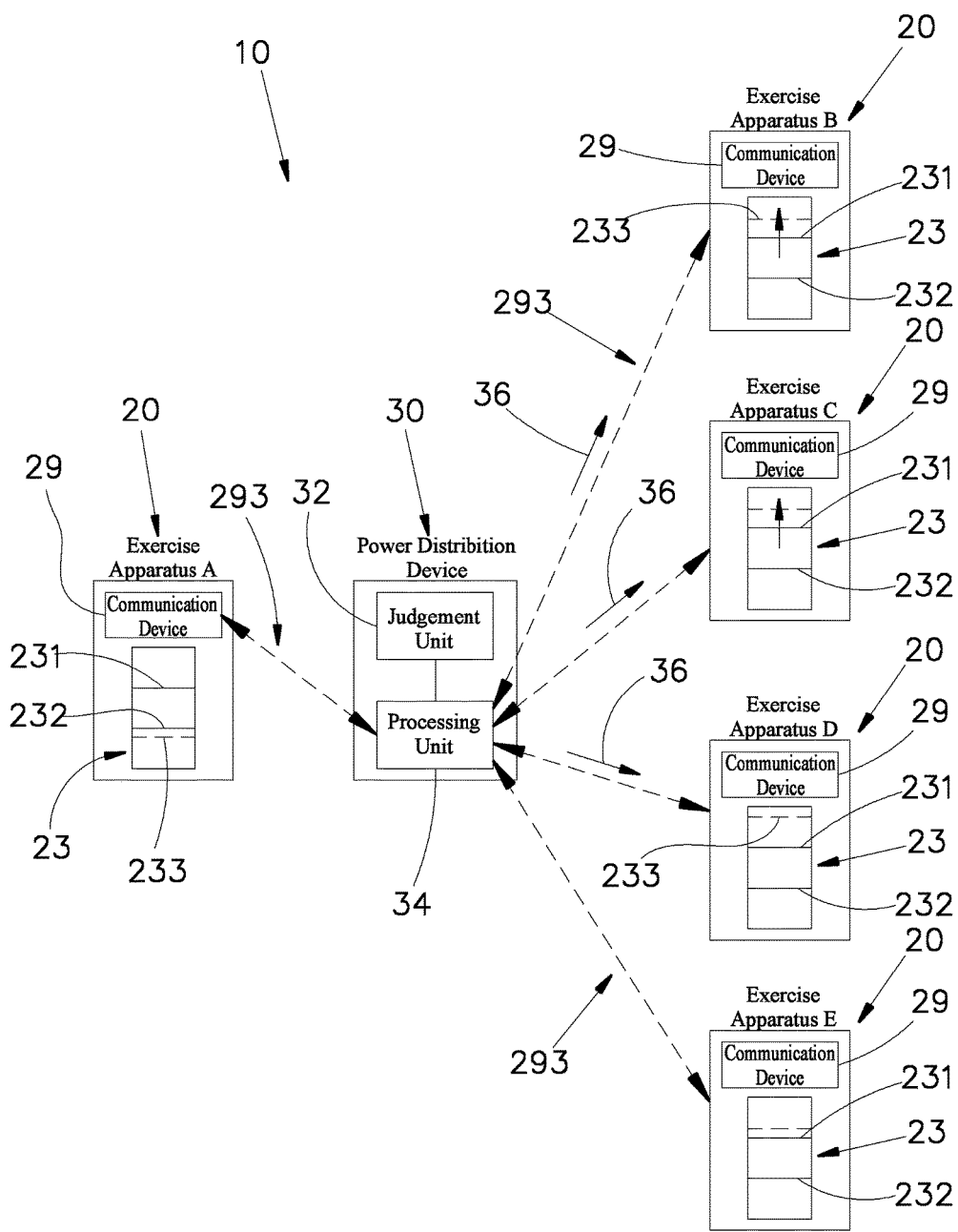
FIG. 4 illustrates the operation of the second embodiment of the present invention.

Referring to FIG. 4, in the same exercise place, some exercise apparatuses may stay occupied and net electric power is positive, or stay in a standby state, or be used frequently, newer models, preferred location or generate much more mechanical energy, under these situations, the electrical quantity of exercise apparatus is higher (e.g. exercise apparatuses B to E). In contrast, some exercise apparatuses may be used less, older models, bad location, or generate less mechanical energy, or the power consuming module 24 (e.g. motors) may consume much more power as the exercise apparatus is in use to make net electric power is negative, in such situations, the electrical quantity is lower (e.g. exercise apparatus A).

The net electric power means electrical energy generated by the exercise apparatus subtracts the consumption of electrical energy by the exercise apparatus. For example, as the net electric power is positive, it means that the electrical energy generated by the exercise apparatus 20 in the course of operation is larger than the electrical energy consumed by the exercise apparatus 20 so as to increase the electrical energy of the power storage module 23 to raise the electrical quantity. In contrast, as the net electric power is negative, it means that the electrical energy generated by the exercise apparatus 20 in the course of operation is less than the electrical energy consumed by the exercise apparatus 20 such that the consumption of electrical energy of the power storage module 23 is great to reduce the electrical quantity.

Referring to FIG. 4, whether the exercise apparatus is in use or standby state, the exercise apparatus could perform operation for electrical energy transmitting or receiving. When the electrical quantity 233 of the power storage 23 of the exercise apparatus A is lower than the second preset value 232, the control unit 28 of the exercise apparatus A is controlled to turn on the power receiving module 26 to make the power receiving module 26 be able to receive energy wave transmitted from other exercise apparatus.

Figure 5:
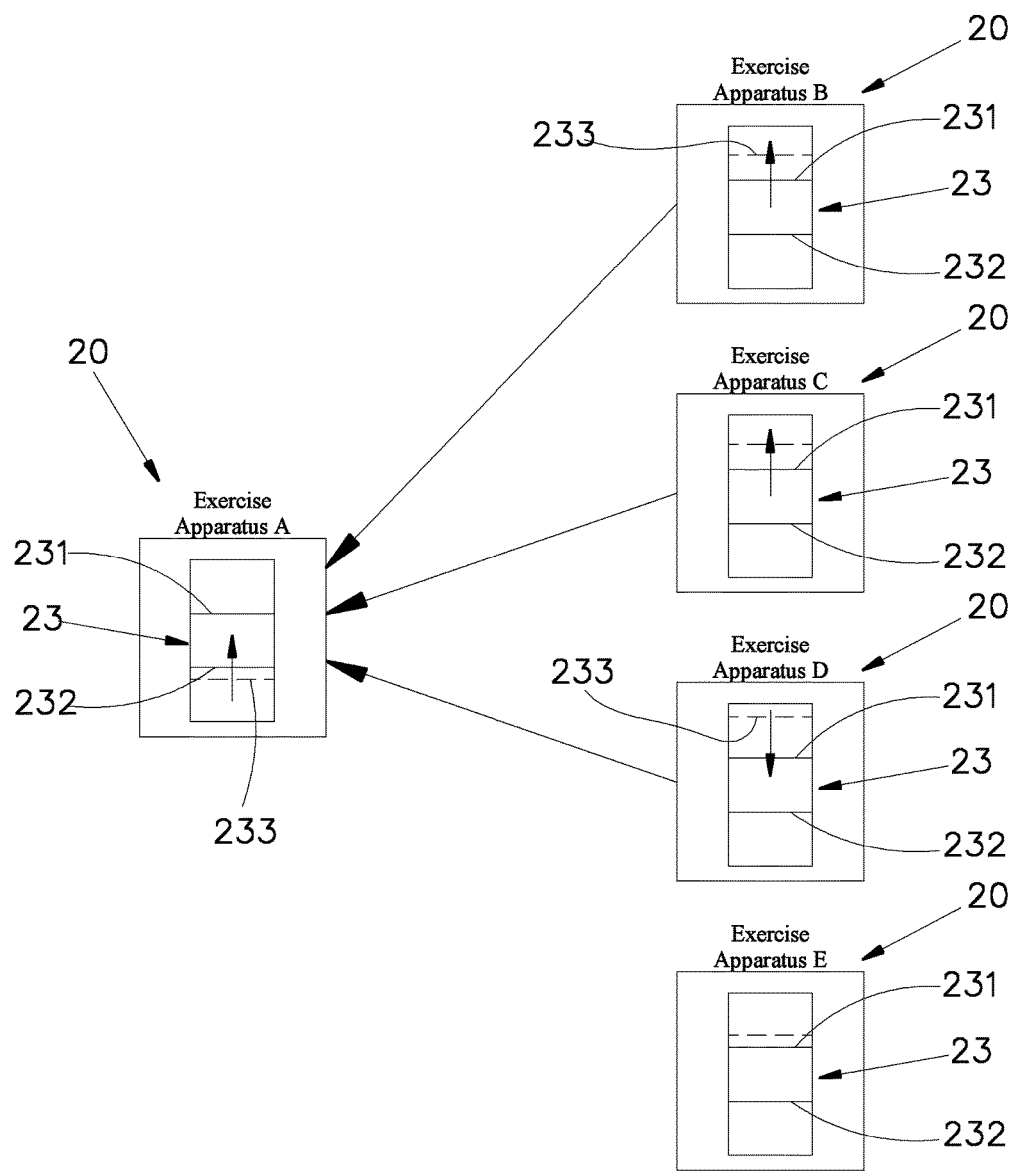
FIG. 5 is a schematic diagram showing the power transmission among the exercise apparatuses.

When the power distribution device 30 detects the electrical quantity 233 of the power storage module 23 of the exercise apparatus A lower than the second preset value 232 via the electrical quantity information transmitted from the exercise apparatus A, the judgment unit 32 will make the processing unit 34 issue a command 36 of power transmitting prior to any exercise apparatus with positive net electric power (e.g. exercise apparatus B and exercise apparatus C), after that, the processing unit 34 would further issue the command 36 of power transmitting to any exercise apparatus with highest electrical quantity 233 of the power storage module 23 (e.g. exercise apparatus D). The number of exercise apparatuses for power transmitting is determined by the different between the electrical quantity 233 of the power storage module 23 of the exercise apparatus A and the second preset value 232. For example, as shown in FIG. 5, the electrical quantity 233 of the power storage module 23 of the exercise apparatus A still need 300 watts to reach the second preset value 232. The exercise apparatus B could provide 150 watts, the exercise apparatus C could provide 100 watts, and the exercise apparatus D could provide 50 watts. The amount of power provided by the three exercise apparatuses B, C, D is sufficient to make the electrical quantity 233 of the power storage module 23 of the exercise apparatus A rise to the second preset value 232, so that the power distribution device 30 has no need to make other exercise apparatuses to perform power transmission.

Figure 6:
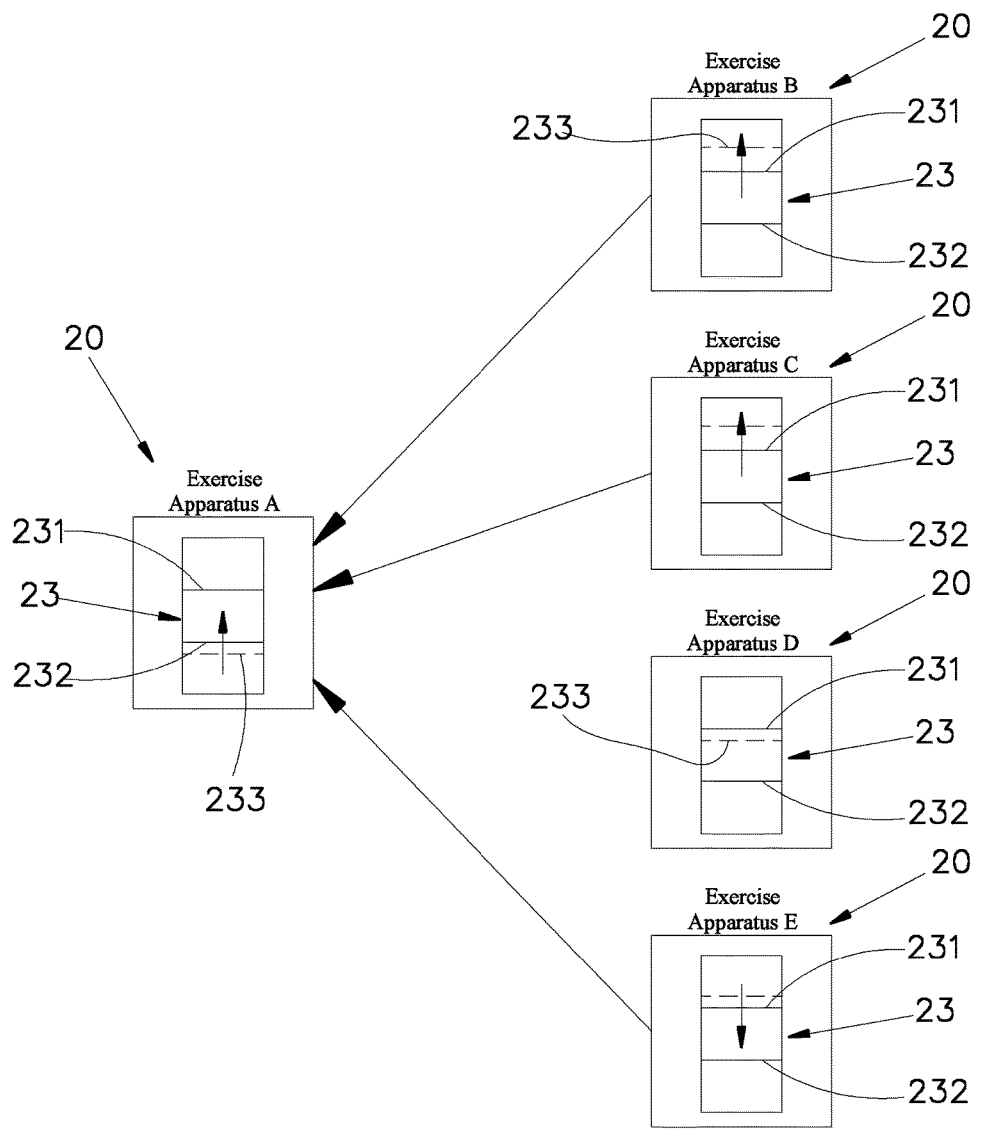
FIG. 6 illustrates that the power transmission condition is switched among the exercise apparatuses shown in FIG. 5.

Referring to FIG. 6, in the course of power transmission, if the electrical quantity 233 of the power storage module 23 of one exercise apparatus is smaller than the first preset value 231, the control unit of the exercise apparatus controls the exercise apparatus to stop power output, or the power distribution device 30 stops the exercise apparatus from transmitting the energy wave outward. Once there are any other exercise apparatuses in a state which is capable for transmitting power outward, the power distribution device 30 will choose another exercise apparatus to transmit power. As shown in FIG. 6, since the electrical quantity 233 of the power storage module 23 of the exercise apparatus D is lower than the first preset value to cause it stop power transmission, the power distribution device 30 makes the exercise apparatus E with secondary high electrical quantity 233 substitute for the exercise apparatus D to transmit power to the exercise apparatus A.

It should be noted that the standard for the power distribution device 30 to sort the electrical quantity 233 of the power storage module 23 of the exercise apparatus may according to the percentage of the electrical quantity 233 higher than the first preset value 231 of the power storage module 23 or the actual electrical quantity of the power storage module 23.

It is understandable that each exercise apparatus could set its electricity transmission power per unit time. Every exercise apparatus can be set in different transmission power. Means for power transmission between the exercise apparatuses could perform power transmission according to the set transmission power, or the net electric power of each exercise apparatus and/or the electrical quantity of the exercise apparatus to distribute the output electrical energy from the exercise apparatuses or the output time.

Figure 7:
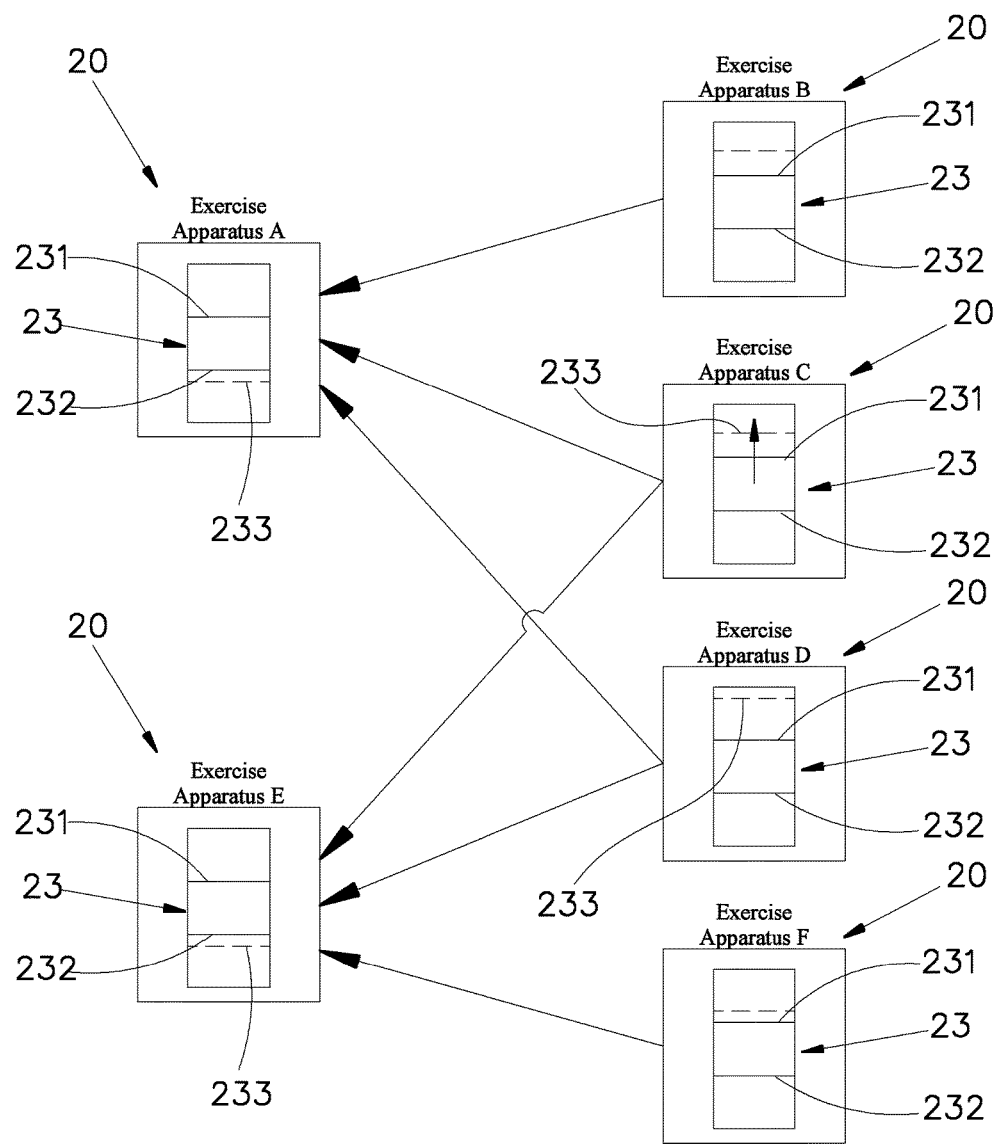
FIG. 7 illustrates another power transmission condition among the exercise apparatuses.

Referring to FIG. 7, when the three exercise apparatuses B, C, D are transmitting electrical energy to the exercise apparatus A, and the three exercise apparatuses B, C, D are sufficient to provide enough power for the exercise apparatus A, and the exercise apparatus F has no need to transmit power to the exercise apparatus A and in a non-transmission state, but the electrical quantity 233 of the exercise apparatus E is lower than the second preset value 232, the power distribution device 30 will prior to have the exercise apparatus F transmit electrical energy to the exercise apparatus E. If the power provided by the exercise apparatus F is insufficient for supplying enough power to the exercise apparatus E, the power distribution device 30 will be prior to sort the exercise apparatus with positive net electric power (such as the exercise apparatus C) to transmit electrical energy to the exercise apparatus E, and it could further sort the exercise apparatus D which has highest electrical quantity 233 to transmit electrical energy to the exercise apparatus E to satisfy the electrical energy the exercise apparatus E needed. Therefore, the exercise apparatuses C, D would perform power transmission to the exercise apparatuses A and E at the same time so as to simultaneously satisfy the need of the electrical energy of the exercise apparatuses A and E to achieve power cooperation.

Specifically, the power distribution device 30 is not limited to be independent with respect to the exercise apparatuses, it could be integrated into one exercise apparatus (e.g. integrated into the control unit of one exercise apparatus), so that the exercise apparatuses in the same place enable users not only to perform exercise, but also to perform electrical energy distribution among the exercise apparatuses. It could also simplify the structure of the power cooperation system 10 and promote function of exercise apparatuses.

Therefore, whether the exercise apparatuses are under occupied or exercising state, the power cooperation system 10 could make at least one exercise apparatus supply electrical energy to at least one other exercise apparatus. It could prevent an exercise apparatus with low utilization or low power generating efficiency from being shut down entirely for normal consumption or overuse, and prevent exercise programs form being interrupted or reset caused by exercising movement of a user being temporarily slow down or stopped so as to keeping every exercise apparatus at an available state. Besides, it will not waste the excess power generated by exercise apparatuses so as to achieve power cooperation purpose and increase utilization of electricity.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A first exercise apparatus for wirelessly sharing electric power with a second exercise apparatus, the first exercise apparatus comprising:
   a motion module configured to generate mechanical energy when a user performs an exercise thereon;
   a power generation module coupled to the motion module and configured for converting the mechanical energy from the motion module into electrical energy;
   a power storage module coupled to the power generation module and configured for storing the electrical energy generated by the power generation module;
   a power consuming module electrically connected to the power storage module and configured for consuming the electrical energy stored in the power storage module;
   a communication device configured to communicate with the second exercise apparatus and defining a wireless communication channel between the first exercise apparatus and the second exercise apparatus for obtaining electrical quantity information of the second exercise apparatus;
   a power transmitting module electrically connected to the power storage module and configured for converting the electrical energy of the power storage module into an energy wave and wirelessly transmitting to the second exercise apparatus; and
   a control unit electrically connected to the power storage module, the communication device and the power transmitting module for controlling the energy wave transmitted from the power transmitting module of the first exercise apparatus to the second exercise apparatus according to the electrical quantity information of the second exercise apparatus.

2. The first exercise apparatus as claimed in claim 1, further comprising a power receiving module connected to the control unit and the power storage module for receiving the energy wave transmitted from the second exercise apparatus; wherein when the electrical quantity of the power storage module is higher than a first preset value, the control unit controls the power transmitting module to transmit the energy wave to other exercise apparatus; when the electrical quantity of the power storage module is lower than a second preset value, the control unit controls the power receiving module to receive the energy wave from other exercise apparatus.

3. The first exercise apparatus as claimed in claim 1, wherein the first exercise apparatus and the second exercise apparatus are the same type of exercise apparatus, when the electrical quantity of the power storage module of the first exercise apparatus is higher than that of the second exercise apparatus, the control unit of the first exercise apparatus controls the power transmitting module to transmit the energy wave to the second exercise apparatus and the second exercise apparatus has a control unit control a power receiving module to receive the energy wave transmitted by the first exercise apparatus.

4. The first exercise apparatus as claimed in claim 1, wherein the communication device has an information transmission module and an information receiving module, the information transmission module configured to transmit the electrical quantity information of the power storage module, and the information receiving module configured to receive the electrical quantity information of other exercise apparatus.

5. The first exercise apparatus as claimed in claim 1 further comprising a power distribution device wirelessly connected between the exercise apparatuses and defining the wireless communication channel for receiving the electrical quantity information of the power storage modules of the respective exercise apparatuses, the power distribution device configured to transfer a command to the first exercise apparatus to make the control unit of the first exercise apparatus to control the energy wave transmitted from the power transmitting module.

6. The first exercise apparatus as claimed in claim 1, wherein the energy wave is electromagnetic waves.

7. The first exercise apparatus as claimed in claim 1, wherein the energy wave is ultrasonic waves.

8. The first exercise apparatus as claimed in claim 1, wherein the power transmitting module of each exercise apparatus transmits the energy wave by beams.

9. A power cooperation system for exerciser apparatuses, comprising:
- at least two exercise apparatuses at the same location, each exercise apparatus having a motion module, a power generation module, a power storage module and at least one power consuming module, the motion module provided for a user to perform a specific exercise and driven by motion of the user to generate mechanical energy, the power generation module connected to the motion module for converting the mechanical energy of the motion module into electrical energy, the power storage module connected to the power generation module for storing the electrical energy generated by the power generation module, the power consuming module electrically connected to the power storage module for consuming the electrical energy stored in the power storage module;
- at least one exercise apparatus having a power transmitting module, other exercise apparatus having a power receiving module, the power transmitting module connected to the power generation module and/or the power storage module of the exercise apparatus with the power transmitting module and configured to convert the electrical energy of the power generation module and /or the power storage module into electromagnetic or ultrasonic waves and transmitting to other exercise apparatus, the power receiving module connected to the power storage module of the exercise apparatus with the power receiving module and configured to receive the electromagnetic or ultrasonic waves from the power transmitting module of other exercise apparatus and converting the electromagnetic or ultrasonic waves into electrical energy and stored in the power storage module;
- the exercise apparatus with the power transmitting module and the exercise apparatus with power receiving module having a wireless communication channel therebetween for transmitting electrical quantity information of the power storage modules of the respective exercise apparatuses; and
- each exercise apparatus having a control unit configured to control the power transmitting module to transmit the electromagnetic or ultrasonic waves and the power receiving module to receive the electromagnetic or ultrasonic waves according to the electrical quantity information of the power storage modules of the respective exercise apparatuses.

10. A method for sharing electric power among exercise apparatuses, the method comprising:
- providing at least two exercise apparatuses, each exercise apparatus having a motion module configured to generate mechanical energy as a user performs an exercise thereon, a power generation module configured for converting the mechanical energy from the motion module into electrical energy, a power storage module configured for storing the electrical energy generated by the power generation module;
- making the at least two exercise apparatuses communicate with each other;
- obtaining electrical quantity information of the power storage module of each exercise apparatus;
- determine whether the electrical quantity of the power storage module of each exercise apparatus is higher than a first preset value or not;
- determine whether the electrical quantity of the power storage module of each exercise apparatus is lower than a second preset value or not;
- wirelessly transmitting the electric power from one exercise apparatus with the electrical quantity of the power storage module higher than the first preset value to the other exercise apparatus with the electrical quantity of the power storage module lower than the second preset value.

* * * * *